(12) United States Patent
Stibbe (10) Patent No.: US 11,708,917 B2
(45) Date of Patent: Jul. 25, 2023

(54) TRIMS FOR PRODUCING PRESSURE DROPS IN SUBJECT FLUIDS AND RELATED VALVES AND METHODS

(71) Applicant: Baker Hughes Oilfield Operations LLC, Houston, TX (US)

(72) Inventor: Holger C. Stibbe, Humble, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/217,494

(22) Filed: Mar. 30, 2021

(65) Prior Publication Data
US 2022/0316621 A1  Oct. 6, 2022

(51) Int. Cl.
*F16K 47/08* (2006.01)
*F16K 1/32* (2006.01)

(52) U.S. Cl.
CPC ............ *F16K 47/08* (2013.01); *F16K 1/32* (2013.01)

(58) Field of Classification Search
CPC .................................. F16K 47/08; F16K 1/32
See application file for complete search history.

(56) References Cited

U.S. PATENT DOCUMENTS

| | | |
|---|---|---|
| 4,258,750 A | 3/1981 | Schnall et al. |
| RE32,197 E | 7/1986 | Self |
| 5,050,571 A * | 9/1991 | Daniels .................. F02M 31/18 123/557 |
| 5,351,717 A | 10/1994 | Saito |
| 5,769,388 A | 6/1998 | Welker |
| 6,250,330 B1 | 6/2001 | Welker |
| 6,926,032 B2 | 8/2005 | Nawaz |
| 9,513,636 B2 | 12/2016 | Fan et al. |
| 9,528,632 B2 * | 12/2016 | Glaun ..................... F16K 47/04 |
| 9,759,348 B2 | 9/2017 | Adams et al. |
| 9,989,977 B2 | 6/2018 | Roper et al. |
| 10,458,555 B2 | 10/2019 | McCarty |
| 10,487,961 B2 | 11/2019 | Eilers et al. |
| 10,605,370 B2 | 3/2020 | Stinn et al. |
| 2005/0061375 A1 | 3/2005 | Baumann |
| 2005/0199298 A1 | 9/2005 | Farrington |
| 2009/0065081 A1 | 3/2009 | Luebbers |

(Continued)

FOREIGN PATENT DOCUMENTS

| | | |
|---|---|---|
| EP | 0167252 A1 | 1/1986 |
| EP | 1746320 A1 | 1/2007 |
| WO | 2010/138119 A1 | 12/2010 |

OTHER PUBLICATIONS

International Search Report for International Application No. PCT/US2022/071352 dated Jul. 6, 2022, 3 pages.

(Continued)

*Primary Examiner* — Patrick C Williams
(74) *Attorney, Agent, or Firm* — TraskBritt (57) ABSTRACT

Valves configured to induce a pressure drop in a subject fluid may include an inlet, a seat, an outlet, and a valve trim located around the seat and interposed between the inlet and the outlet. The valve trim may include an annulus including a monolithic, unitary, porous material defining a tortuous, interconnected space extending radially through the annulus. Pores at an exterior of the monolithic, unitary, porous material being arranged in a close-packed hexagonal space lattice.

20 Claims, 5 Drawing Sheets

(56) References Cited

U.S. PATENT DOCUMENTS

| | | | |
|---|---|---|---|
| 2009/0183790 A1* | 7/2009 | Moore | F16K 47/08 |
| | | | 251/118 |
| 2009/0205729 A1 | 8/2009 | Wears et al. | |
| 2011/0094607 A1* | 4/2011 | Elliott | F16K 47/08 |
| | | | 137/511 |
| 2013/0199995 A1* | 8/2013 | Jiang | F17D 3/01 |
| | | | 40/406 |
| 2014/0021383 A1 | 1/2014 | Yli-Koski et al. | |
| 2015/0108379 A1* | 4/2015 | Juhnke | F16K 3/24 |
| | | | 251/127 |
| 2016/0102781 A1 | 4/2016 | Glaun | |
| 2017/0102076 A1 | 4/2017 | Reynolds et al. | |
| 2017/0138507 A1 | 5/2017 | Kluz et al. | |
| 2017/0268697 A1 | 9/2017 | McCormick et al. | |
| 2019/0101228 A1* | 4/2019 | Gabriel | F16K 3/24 |
| 2020/0003334 A1 | 1/2020 | McCormick | |

OTHER PUBLICATIONS

International Search Report for International Application No. PCT/US2022/071352 dated Jul. 6, 2022, 4 pages.

\* cited by examiner

TRIMS FOR PRODUCING PRESSURE DROPS IN SUBJECT FLUIDS AND RELATED VALVES AND METHODS

FIELD

This disclosure relates generally to trims for valves which may be configured to generate a pressure drop as well as regulate flow of fluid through the valves. More specifically, disclosed embodiments relate to trims for valves which may reduce turbulent flow of fluid downstream of the trims, induce more laminar flow in fluid downstream of the trims, and reduce loud and potentially damaging vibrations.

BACKGROUND

Valves for regulating the flow of fluid within a system may be configured to induce a predetermined pressure drop across the valves. One technique for inducing such a pressure drop is to include a so-called "trim" into the valve. Trims may be positioned between an inlet and an outlet of a valve design, and conventionally may define a tortuous flow path for the fluid to flow through to produce the pressure drop. For example, conventional trims known to the inventor may generally be configured as a hollow right cylinder which may surround a seat proximate to an inlet of the valve and be surrounded by a volume leading to the outlet of the valve. Such conventional trims may be formed from stacking annular discs having patterns of holes machined or otherwise formed in the discs. The way in which those holes may overlap may define the tortuous path through which fluid may flow, enabling the fluid to flow from an interior of the trim, through the trim, to an exterior of the trim, or vice versa. The discs may be affixed to one another in a stack, with end plates enclosing axial ends of the trim.

BRIEF SUMMARY

Valve trims may include an annulus having a monolithic, unitary, porous material defining a tortuous, interconnected space extending radially through the annulus. Pores at an exterior of the monolithic, unitary, porous material may be arranged in a close-packed hexagonal space lattice.

Valves configured to induce a pressure drop in a subject fluid may include an inlet, a seat, an outlet, and a valve trim located around the seat and interposed between the inlet and the outlet. The valve trim may include an annulus having a monolithic, unitary, porous material defining a tortuous, interconnected space extending radially through the annulus. Pores at an exterior of the monolithic, unitary, porous material may be arranged in a close-packed hexagonal space lattice.

Methods of making valve trims may involve sequentially placing discrete quantities of material in a shape of an annulus. The discrete quantities of the material may be exposed to heat to fuse the discrete quantities of material to one another, forming a monolithic, unitary, porous material defining a tortuous, interconnected space extending radially through the annulus. Pores at an exterior of the monolithic, unitary, porous material may be defined to be in a close-packed hexagonal space lattice.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings. In the drawings:

DETAILED DESCRIPTION

The illustrations presented in this disclosure are not meant to be actual views of any particular valve, trim, or component thereof, but are merely idealized representations employed to describe illustrative embodiments. Thus, the drawings are not necessarily to scale.

Disclosed embodiments relate generally to trims for valves which may reduce turbulent flow of fluid downstream of the trims, induce more laminar flow in fluid downstream of the trims, and reduce loud and potentially damaging vibrations. More specifically, disclosed are embodiments of trims for valves which may form a tortuous flow path for subject fluids by presenting a porous material through which the subject material may flow. For example, such trims may include a monolithic, unitary, porous material defining a tortuous, interconnected space through which a subject fluid may flow, producing a desired pressure reduction in the subject fluid. In some embodiments, such trims may include concentrated masses of the material arranged in a packing pattern, such as, for example, a close-packed hexagonal packing pattern. More specifically, such trims may include generally spherical concentrated masses of the material stacked in a close-packed hexagonal pattern.

In some embodiments, trailing portions of the monolithic, unitary, porous material may also be shaped to actively induce laminar flow in subject fluids exiting the trim. For example, portions of the monolithic, unitary, porous material adjacent to the pores at an exterior of the trim have at least substantially pyramid shapes, with peaks of the shapes facing away from a central geometric axis of the trim. Such shapes may provide a gradual transition from the tortuous path within the monolithic, unitary, porous material, to the exterior of the trim, which may induce laminar flow in the subject fluid, or at least reduce the incidence and/or severity of turbulent flow.

To enable formation of such a complex geometry material, with an associated complex network of interconnected spaces through which a material may flow, additive manufacturing techniques may be utilized to form the monolithic, unitary, porous material of the trim. For example, direct metal laser sintering, electron beam melting, selective laser sintering, selective laser melting, binder jetting, powder bed fusion, or other 3D printing techniques may be utilized to selectively fix powder particles of the material in place and form covalent bonds among those particles to form the monolithic, unitary, porous material, and fixation and bonding may occur simultaneously in some embodiments. As a more specific example, a powder of the material, optionally mixed with a binder, may be sequentially deposited in the shape of the relevant portions of the trim, forming a green part, and the green part may subsequently be fused, and any binder material burned off, by exposure to heat (e.g., sintering, heat treatment). As another more specific example, targeted portions of a powder bed of the material may be exposed to heat (e.g., utilizing a laser) or may be exposed to a binder material to fix those portions in place and optionally to fuse them together. Subsequent heat treatment, and/or subtractive manufacturing techniques (e.g., machining, laser cutting), may be performed on the resulting monolithic, unitary, porous material before deployment as a trim in a valve.

Configurations for trims for valves in accordance with this disclosure may reduce the likelihood that a subject fluid exiting the trims may exhibit turbulent flow proximate to, and in a section of pipe or tubing downstream of the valves. For example, distribution of output pores, the shapes for the tortuous path, and the shapes of external portions of trims for valves in accordance with this disclosure may actively encourage laminar flow of fluids, at least immediately adjacent to and downstream of a given trim. In some embodiments, trims in accordance with this disclosure may reduce the intensity of, or eliminate, vibrations that would be produced if a stacked-plate-style trim were used. Such a reduction in vibration may reduce the incidence and/or intensity of noise associated with operating the valves. In addition, such a reduction in vibration may reduce the risk that such vibration would affect movement of, and reduce the reliability of control over, other components of the valve, such as the movement of the stem and orientation and positioning of the associated plug.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

As used herein, the term "monolithic" means and includes structures formed from a contiguous mass of material bonded utilizing chemical bonds, and at least substantially lacking adjacent surfaces of unbonded material. For example, monolithic structures may be made by sequentially positioning particles of a material in place utilizing an additive manufacturing process (e.g., 3D-printing, selective laser sintering, binder jetting) and subsequently or concurrently fusing those particles to one another by chemical bonds (e.g., covalent bonds, metallic bonds) by exposure to heat, may be cast, may be machined from a precursor mass of the material. Subsequent processing, such as heat treatment, densification (e.g., through sintering), and connection to another structure (e.g., through adhesion, welding, brazing, a pinned, bolted, riveted connection) may be performed on a monolithic structure.

The term "close-packed hexagonal" with reference to a material, structure, or other arrangement of clustered masses, as used herein, means and includes the shape formed by arranging a grouping of generally polyhedron shapes of the material, structure, or other clustered masses in close-packed, offset layers, with unit cells composed of seven generally polyhedron shapes, six at vertices of a hexagon and the seventh proximate to a geometric center of the hexagon. For example, a close-packed hexagonal structure may include concentrated masses of a given material shaped at least substantially as spheres, optionally with some intersection between adjacent sphere shapes as the spheres may be fused or otherwise bonded together, forming seven-sphere, hexagonal unit cells in layers, with adjacent layers stacked on one another and offset by about 1.1 times a radius of the spheres or less, and alternating layers having polyhedron shapes generally aligned with one another.

As used herein, the term "close-packed hexagonal" with reference to a space lattice means and includes an interconnected network of three-dimensional space, whether occupied or unoccupied by a material (e.g., void, environmental fluid, such as air, infiltrated solid material) located among the materials, structures, or other clustered masses in a close-packed hexagonal arrangement. For example, a close-packed hexagonal space lattice may itself form a pattern, with openings, spaces (occupied or unoccupied), pores, or voids of the close-packed hexagonal space lattice arranged at vertices of a hexagon shape surrounding a given concentrated mass of the close-packed hexagonal material, structure, or other clustered mass.

Figure 1:
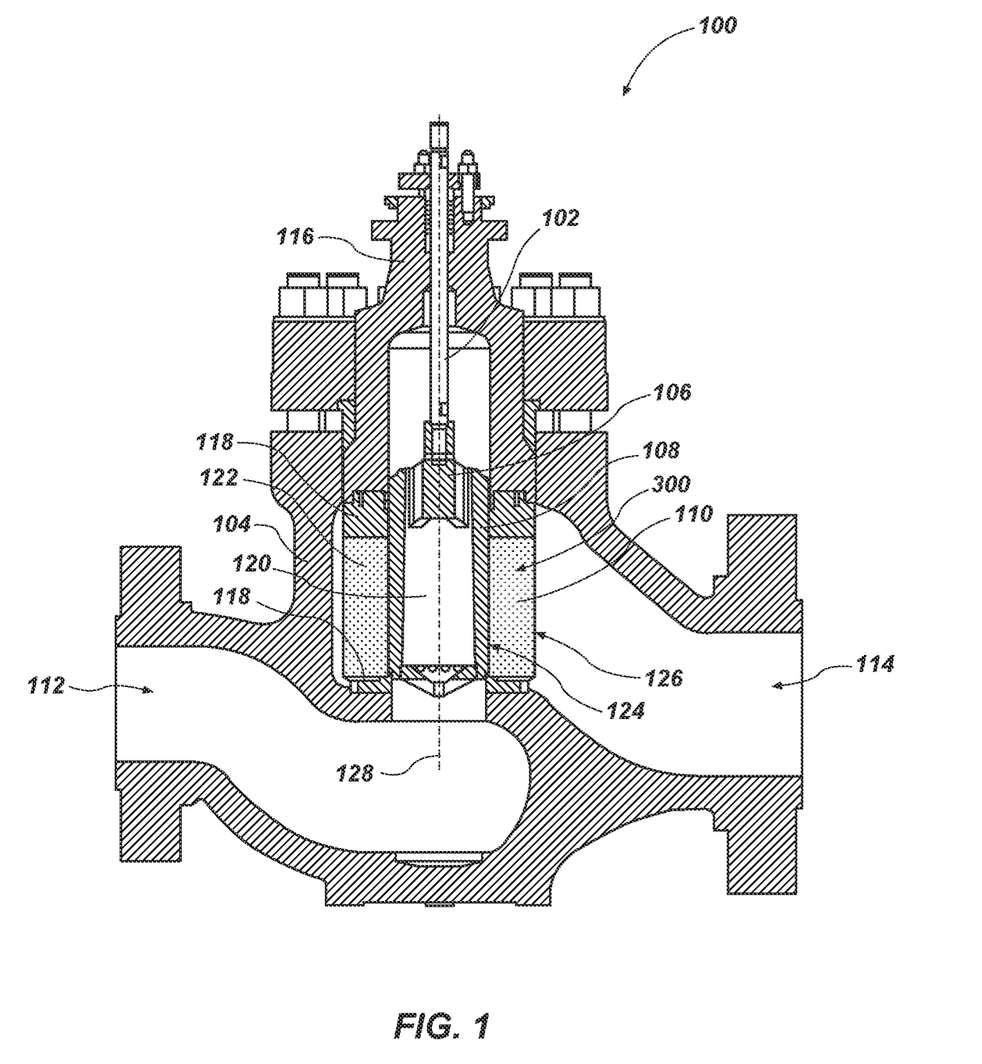
FIG. 1 is a cross-sectional side view of a valve including a trim in accordance with this disclosure.

FIG. 1 is a cross-sectional side view of a valve 100 including a trim 110 in accordance with this disclosure. In some embodiments, the valve 100 may generally be configured as a globe valve, as shown in FIG. 1. For example, the valve 100 may include a housing 104 in and on which other components of the valve 100 may be supported, and which may optionally define internal fluid passageways to form a portion of the fluid path through the valve 100. For example, the housing 104 may define an inlet 112 for receiving an incoming subject fluid into the valve 100 and an outlet 114 for outputting the subject fluid from the valve 100. The housing 104 may support a bonnet 116, which may, in turn, support a stem 102 movable with respect to the bonnet 116. A plug 106 may be affixed to the stem 102, such that movement of the stem 102 may induce corresponding movement of the plug 106. The plug 106 may selectively engage with, and disengage from, a seat 108 defined or supported by the housing 104 to seal off, open, and optionally control a rate of subject fluid flow through the valve 100. While the valve 100 of FIG. 1 is specifically depicted as a globe valve, valves in accordance with this disclosure, and trims 110 usable with valves as contemplated in this disclosure, may be configured as other types of valves, such as, for example, ball valves, butterfly valves, gate valves, check valves, plug valves, pinch valves, needle valves, diaphragm valves, relief valves, solenoid valves, etc.

A trim 110 may be interposed between the inlet 112 and the outlet 114 of the valve 100. For example, the trim 110 may be located between the mechanism for opening and closing the valve 100 and the outlet 114 of the valves. More specifically, the trim 110 may generally be shaped as a hollow prism located at least partially around the seat 108, at least a portion of the plug 106, and a portion of the stem 102, such that any subject fluid that has passed through a space defined between the plug 106 and the seat 108 may then flow through the trim 110 before reaching the outlet 114. As a specific, nonlimiting example, the trim 110 may generally be shaped as a hollow right cylinder, the trim 110 may surround at least a portion of the seat 108, at least a portion of the plug 106, and a portion of the stem 102, and any subject fluid that has flowed between the seat 108 and the plug 106 may encounter, and be required to flow through, the trim 110 to proceed from the inlet 112 toward the outlet 114.

The trim 110 may include a monolithic, unitary, porous material 200 defining a tortuous, interconnected space through which a subject fluid may flow to produce a pressure drop in the subject fluid across the trim 110. For example, those portions of the trim 110 through which a subject fluid may be flowable may be formed from concentrated, interconnected masses of material, defining a network of pores among the concentrated, interconnected masses of the material to enable a subject fluid to flow through the trim 110 while providing a selectable intensity of resistance to that flow and a corresponding selectable drop in pressure across the trim 110. More specifically, the trim 110 may include one or more end plates 118 located at opposing longitudinal ends of the trim 110, inhibiting flow of the subject fluid in directions other than from the inlet 112 toward the outlet 114, a bore 120 through which incoming subject fluid may be introduced to pores of the monolithic, unitary, porous material 200 exposed at a surface of the trim 110 defining the bore 120, and the monolithic, unitary, porous material 200 extending between the end plates 118, defining the bore 120, defining an interconnected network of pores through which the subject fluid may flow from proximate to the inlet 112 toward the outlet 114, and defining a tortuous path to produce a predetermined pressure drop in the subject fluid across the trim 110. As a specific, nonlimiting example, the end plates 118 may be located above and below an annulus 122 of the monolithic, unitary, porous material 200 when the trim 110 is in the orientation shown in FIG. 1, and the monolithic, unitary, porous material 200 may be formed primarily utilizing a single additive manufacturing process, with optional, ancillary subtractive manufacturing, heat treatment, densification, and/or other additive manufacturing (e.g., to fuse the end plates 118 to the annulus 122). The trim 110 may be free of adjacent plates having overlapping recesses or holes formed by subtractive manufacturing processes therein, and the tortuous flow path may likewise be free of portions defined by surfaces formed by application of subtractive manufacturing processes to plates or discs and stacking those plates or discs on one another.

The monolithic, unitary, porous material 200 of the trim 110 may define a tortuous, interconnected space enabling subject fluid to flow from proximate to the inlet 112 toward the outlet 114 For example, the monolithic, unitary, porous material 200 may define a tortuous, interconnected space extending radially through the annulus 122 with pores of the monolithic, unitary, porous material 200 being open to fluid communication at a radially inner surface 124 and a radially outer surface 126 of the annulus 122. As a result, incoming subject fluid within the bore 120 of the trim 110 may enter the monolithic, unitary, porous material 200 through pores exposed at the radially inner surface 124 of the annulus 122, may flow radially outward through the monolithic, unitary, porous material 200, and may exit the trim to flow toward the outlet 114 through pores exposed at the radially outer surface 126 of the annulus 122.

A pressure drop inducible by the trim 110 may be selectable, at least in part, by modifying a density of the monolithic, unitary, porous material 200. For example, the density of the monolithic, unitary, porous material 200 may be less than if the annulus 122 were nonporous, preventing all flow of fluid through the annulus, and more than if the monolithic, unitary, porous material 200 presented little to no resistance to flow of a subject fluid through the trim 110. More specifically, the density of the monolithic, unitary, porous material 200 may be, for example, about 7 g/cm$^3$ or less. As a specific, nonlimiting example, the density of the monolithic, unitary, porous material 200 may be between about 2.5 g/cm$^3$ and about 6 g/cm$^3$ (e.g., about 3 g/cm$^3$, about 4 g/cm$^3$, about 5 g/cm$^3$).

The pressure drop inducible by the trim 110 may be selectable from a wide range of potential pressure drops achievable utilizing the monolithic, unitary, porous material 200. In some embodiments, utilizing the monolithic, unitary, porous material 200 may be particularly suitable for applications where a high pressure drop is desired. For example, the monolithic, unitary, porous material 200 may be configured to induce a pressure drop of about 99.9% or less in a subject fluid as the subject fluid flows through the tortuous, interconnected space defined by the monolithic, unitary, porous material 200 of the trim 110. In other words, the pressure of the subject fluid on a side of the trim 110 proximate to the outlet 114 may be about 0.1% of the pressure of the subject fluid on a side of the trim 110 proximate to the inlet 112, or more. More specifically, the monolithic, unitary, porous material 200 may be configured to induce a pressure drop of between about 90% and about 99.6% in a subject fluid as the subject fluid flows through the tortuous, interconnected space. As a specific, nonlimiting example, the monolithic, unitary, porous material 200 may be configured to induce a pressure drop of between about 92.5% and about 99.5% (e.g., about 95%, about 98%, about 99%) in a subject fluid as the subject fluid flows through the tortuous, interconnected space.

The monolithic, unitary, porous material 200 of the trim 110 may be configured to reduce the incidence, and/or severity, of turbulent flow in the subject fluid downstream of the trim 110. For example, a distribution of the pores at the radially outer surface 126 of the annulus 122 may reduce the likelihood that interactions between adjacent, localized streams of the subject fluid exiting from adjacent pores at the radially outer surface 126 of the trim 110 would induce turbulent flow in the subject fluid proximate to, and downstream of, the trim 110. As another example, the distribution of the pores at the radially outer surface 126, and optionally the shape of those portions of the monolithic, unitary, porous material 200 at the radially outer surface 126 that define the pores therebetween, may actively induce laminar flow in a subject fluid proximate to, and downstream of, the annulus 122.

Such a reduction in turbulent flow, and potential active inducement of laminar flow, may reduce the likelihood that the flow of the subject fluid through the valve 100, and particularly through the trim 110, would produce vibrations in the valve 100 itself, as well as in the piping and other components upstream and downstream from the valve 100. For example, reductions in turbulent flow enabled by trims 110 in accordance with this disclosure may reduce the likelihood that vibrations may cause unintended relative movement between components of the valve 100, such as between the stem 102 and the bonnet 116, which may increase the reliability and accuracy of the operation of the valve 100, especially over long periods of time. In addition, reductions in turbulent flow enabled by trim 110 in accordance with this disclosure may reduce the likelihood that vibrations may produce loud, disruptive audible noise in the vicinity of the valve 100.

Materials of the trim 110 may depend, at least in part, on the application for the valve 100 and associated trim 110. For example, the materials of the trim 110 may be chemically nonreactive with the subject fluid or subject fluids intended to be used with the valve 100, may be medical grade materials, and/or may be configured for stable operation at the temperatures, pressures, and exposure to other environmental conditions in the intended application. More specifically, the materials of the trim 110 may be capable of being positioned into a shape of a porous annulus 122 through additive manufacturing processes, and may have strength, density, and reactivity properties suitable for use in the anticipated application. As specific, nonlimiting examples, the materials of the trim 110 may include metals, metal alloys, ceramics, polymers, and/or composite materials or solid solutions of these (e.g., stainless steel, tungsten carbide particles in a metal matrix material, sandstone). In some embodiments, the monolithic, unitary, porous material 200 of the trim 110 may not be homogeneous. For example, the density, material type, or relative concentrations of materials in a composite or solid solution may be distributed in a gradient through the annulus 122, such as varying radially from the radially inner surface 124 toward the radially outer surface 126 or varying longitudinally from one end plate 118 toward the other end plate 118.

Figure 2:
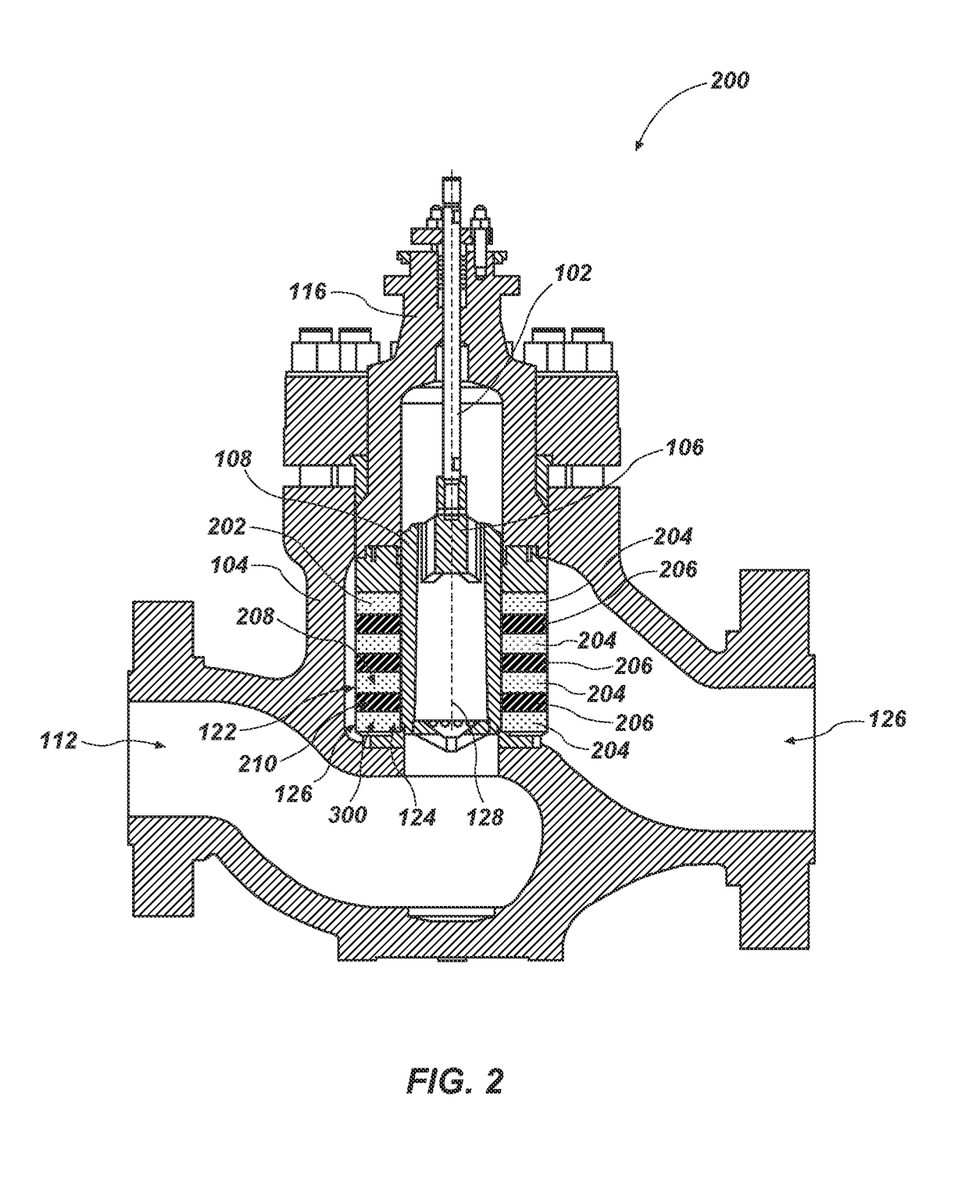
FIG. 2 is a cross-sectional side view of a valve including another embodiment of a trim in accordance with this disclosure.

FIG. 2 is a cross-sectional side view of a valve 200 including another embodiment of a trim 202 in accordance with this disclosure. The valve 200 of FIG. 2 may be at least substantially similar to the valve 100 of FIG. 1, and may adopt any of the structural variations and configurations discussed in greater detail in connection with FIG. 1.

In some embodiments, the trim 202 interposed between the inlet 112 and the outlet 114 of the valve 200 may include first regions 204 including porous material 208 and second regions 206 including nonporous material 210. For example, each first region 204 including the porous material 208 may extend radially from the radially inner surface 124 to the radially outer surface 126 and longitudinally along a portion of the central geometric axis 128 of the trim 202, forming only a portion of the vertical height of the trim 202 when the trim 202 is in the orientation depicted in FIG. 2. Similarly, each second region 206 may extend radially from the radially inner surface 124 to the radially outer surface 126 and longitudinally along a portion of the central geometric axis 128 of the trim 202, forming only a different portion of the vertical height of the trim 202 when the trim 202 is in the orientation depicted in FIG. 2.

In some embodiments, the first regions 204 and second regions 206 may alternate longitudinally with one another. For example, each pair of first regions 204 may include a second region 206 interposed therebetween, and each pair of second regions 206 may include a first region 204 interposed therebetween. More specifically, each first region 204 and each second region 206 may generally have a shape of a portion of the annulus 122, respective first regions 204 may be located proximate to, abut against, and be affixed to the end plates 118, and the first regions 204 and second regions 206 may alternate with one another to occupy the remaining longitudinal space between the end plates 118.

The presence of second regions 206 including nonporous material 210 in the trims 202 may reduce the likelihood that subject fluid flowing through the porous material 208 of the first regions 204 may flow in unintended directions, reducing the efficiency of the valve 200. For example, the second regions 206 may be positioned and configured to encourage subject fluid to flow primarily from the radially inner surface 124 of the trim 202 toward the radially outer surface 126 of the trim 202, reducing the extent to which the subject fluid would be capable of flowing in directions parallel to the central geometric axis 128. More specifically, the presence, shape, and positioning of the second regions 206 including nonporous material 210 may increase the likelihood that subject fluid flowing through the trim 202 may travel primarily in a direction perpendicular to the central geometric axis 128, and reduce the likelihood that the subject fluid may travel in a direction parallel to the central geometric axis 128. Encouraging the subject fluid to take a more direct path through the trim 110 may increase the likelihood that introduction of the trim 202 will have the expected effect on pressure and flow rates of the subject fluid through the valve 200.

In some embodiments, the nonporous material 210 of the second regions 206 may be monolithic and unitary with the porous material 208 of the first regions 204. For example, the first regions 204 and the second regions 206 may be formed utilizing a single additive manufacturing process, with the material in the second regions 206 having a higher density and the density of the material in the first regions 204. More specifically, greater quantities of the material of the trim 202 may be placed in the second regions 206, or those quantities of precursor material in the second regions 206 may be exposed to higher temperatures, to melting or sintering temperatures for longer periods of time, or both, to cause the material in the second regions 206 to be a nonporous material 210. Lesser quantities of the material of the trim 202 may be placed in the first regions 204, or those quantities of the precursor material in the first regions 204 may be exposed to lower temperatures, to melting or sintering temperatures for shorter periods of time, or both, to ensure the material in the first regions 204 remains a porous material 208.

In other embodiments, the nonporous material 210 of the second regions 206 may be discrete and distinct from the porous material 208 of the first regions 204. For example, the nonporous materials 210 may be provided as solid, full-density, annular plates or discs, and the porous materials 208 may be provided as separate, porous, annular plates or discs. The respective plates or discs may be stacked in an alternating fashion and affixed to one another (e.g., by welding, brazing, adhesion, bolts, screws, pins, etc.) to form the first regions 204 and the second regions 206 of the trim 202.

Figure 3:
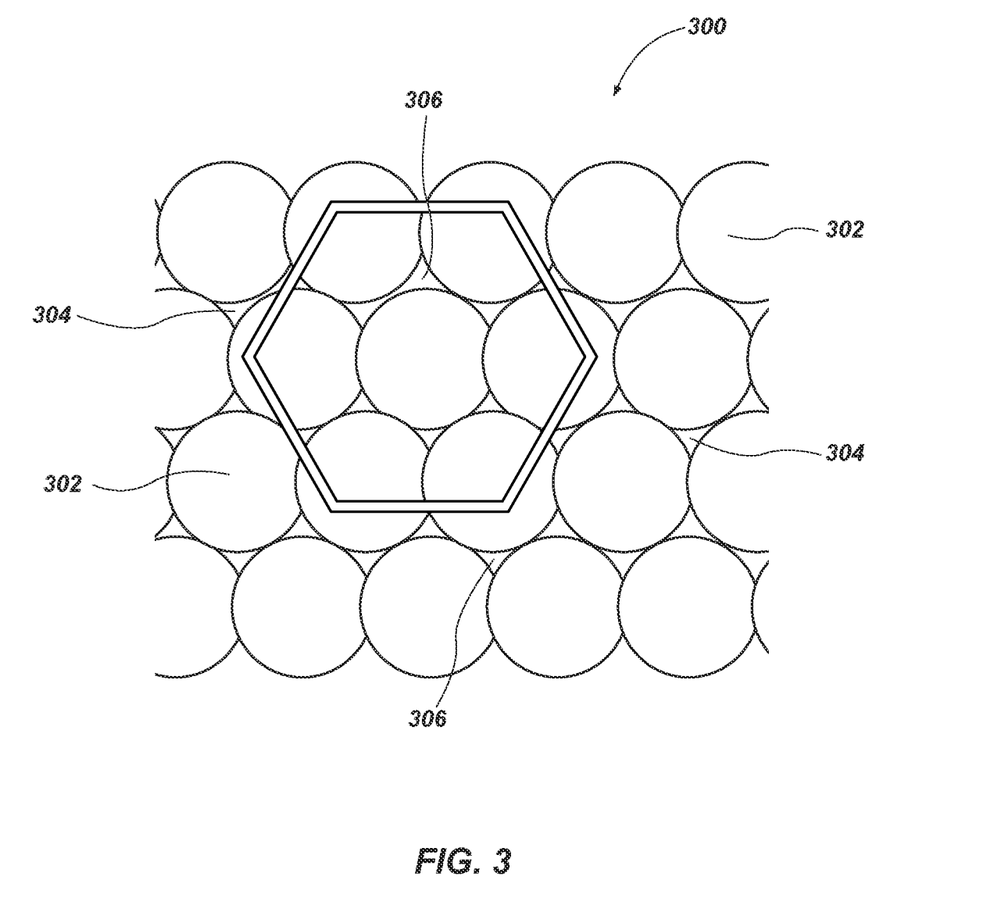
FIG. 3 is a schematic illustrating an arrangement for a portion of a monolithic, unitary, porous material usable for trims.

FIG. 3 is a schematic illustrating an arrangement for a portion of a monolithic, monolithic, unitary, porous material 300 usable for trims in accordance with this disclosure. Specifically, FIG. 3 depicts an illustrative packing pattern for a single layer of the concentrated masses 302 of the monolithic, unitary, porous material 300 wherein the concentrated mass 302 are generally shaped as spheres, and unit cells of the concentrated masses 302 may be arranged in hexagonal shapes with one of the concentrated masses 302 located at each respective vertex of the hexagon and another concentrated mass 302 located in a geometric center of the hexagon. To form the monolithic, unitary, porous material 300 respective layers of the concentrated masses 302 may be placed adjacent to one another, and the concentrated masses 302 in adjacent layers may be offset from one another to provide close packing, while maintaining the open network of interstitial spaces 304 among the interconnected concentrated masses 302 of the monolithic, unitary, porous material 300.

In some embodiments, the monolithic, unitary, porous material 300 may be formed by placing respective concentrated masses 302 in a predetermined packing pattern, leaving an interconnected network of interstitial spaces 304 among the concentrated masses 302. For example, at least those concentrated mass 302 of the monolithic, unitary, porous material 300 exposed at the radially outer surface 126 (see FIG. 1) may be arranged in a close-packed hexagonal pattern, causing the pores 306 exposed at the exterior of the monolithic, unitary, porous material 300 to be arranged in a close-packed hexagonal space lattice. More specifically, the concentrated masses 302 of the monolithic, unitary, porous material 300 throughout the annulus 122 (see FIG. 1) may be arranged in a close-packed hexagonal pattern, causing the interstitial spaces 304 throughout the monolithic, unitary, porous material 300 to be arranged in a close-packed hexagonal space lattice.

The individual prism shapes of the concentrated masses 302 may be fused to one another with varying degrees of overlap. For example, the concentrated masses 302 may be interconnected only to the degree required to provide sufficient structural strength to resist the flow of subject fluid through the monolithic, unitary, porous material 300, at least substantially approximating point-to-point surface connections between the concentrated masses 302. As another example, the concentrated mass 302 may be interconnected to a greater degree to further restrict the size of the interconnected network of interstitial spaces 304 among the concentrated masses 302, increasing the density of the monolithic, unitary, porous material 300. More specifically, an apparent overlap between the prism shapes of adjacent concentrated masses 302 may be about 25% of a radius of a given concentrated mass 302 or less. As a specific, nonlimiting example, the apparent overlap between the prism shapes of the adjacent concentrated masses 302 may be between about 1% and about 20% (e.g., about 5%, about 10%, about 15%) of the average radius of the two adjacent concentrated masses 302.

Figure 4:
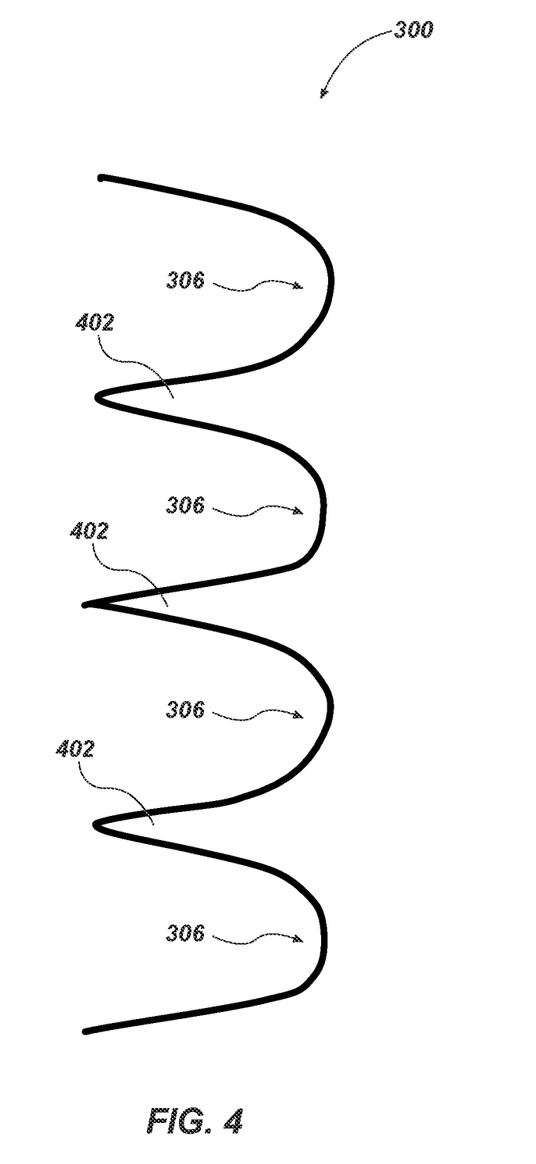
FIG. 4 is a schematic profile side view illustrating a shape for another portion of the monolithic, unitary, porous material usable for trims.

FIG. 4 is a schematic profile side view illustrating a shape for another portion of the monolithic, unitary, porous material 300 usable for trims in accordance with this disclosure. In some embodiments, the shape of the portions 402 of the monolithic, unitary, porous material 300 exposed at the radially outer surface 126 (see FIG. 1) of a trim 110 (see FIG. 1) may be configured to reduce the likelihood that subject fluid exiting the pores 306 at the exterior of the trim 110 (see FIG. 1). For example, the portions 402 of the monolithic, unitary, porous material 300 exposed at the radially outer surface 126 may exhibit a taper with a greatest dimension of a given portion 402 being located proximate to the central geometric axis 128 (see FIG. 1) and a smallest dimension of the given portion 402 being located distal from the central geometric axis 128 (see FIG. 1) of the trim 110 (see FIG. 1). More specifically, those portions 402 of the monolithic, unitary, porous material 300 adjacent to the pore 306 at the exterior may have, for example, at least substantially pyramid shapes, with peaks of the shapes facing away from a central geometric axis 128 (see FIG. 1) of the annulus 122 (see FIG. 1) of the trim 110 (see FIG. 1). As a specific, nonlimiting example, the portions 402 of the monolithic, unitary, porous material 300 adjacent to the pores 306 at the exterior may have at least substantially conic shapes.

Figure 5:
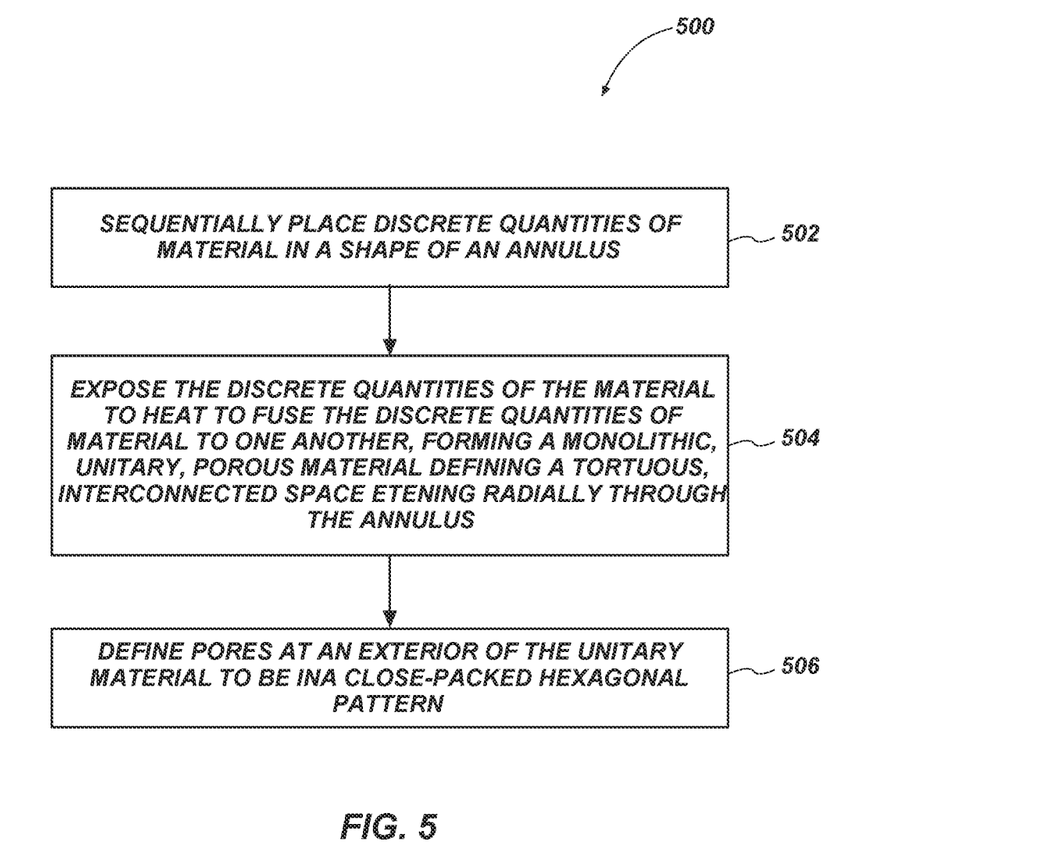
FIG. 5 is a flow chart showing an illustrative method of making trims for valves in accordance with this disclosure.

FIG. 5 is a flow chart showing an illustrative method 500 of making trims for valves in accordance with this disclosure. The method 500 may involve, for example, sequentially placing discrete quantities of material in a shape of an annulus, as indicated at act 502. More specifically, sequentially placing the discrete quantities of the material in the shape of the annulus may involve, for example, depositing the discrete quantities in the shape of the annulus in layers or affixing the discrete quantities to one another in the shape of the annulus from within a powder bed of the material. As specific, nonlimiting examples, the discrete quantities of material may be provided in the form of a powder, optionally intermixed with or suspended in a binder material, and may be sequentially placed by being dispensed from a 3D printer head or may be sequentially placed by blanket deposition in a powder bed.

The discrete quantities of the material may be exposed to heat to fuse the discrete quantities of material to one another, forming a monolithic, unitary, porous material defining a tortuous, interconnected space extending radially through the annulus, as indicated at act 504. For example, the discrete quantities of the material may be exposed to heat during the placement stage, such as by directing radiation emitted by a laser toward the discrete quantities of the material in a targeted manner. As another example, the discrete quantities of the material may be exposed to heat following placement of all the material, such as by placing a green part (i.e., an unfused, unsintered part) in a furnace, optionally applying pressure, and densifying the green part to fuse the discrete quantities of the material to one another (i.e., sintering). Such a process may also involve burning off any quantities of binder material.

Pores may be defined at an exterior of the unitary material to be in a close-packed hexagonal space lattice, as indicated at act 506. For example, at least those portions of the material located at an outlet of the trim may be arranged in a close-packed hexagonal pattern, causing the pores defined therebetween to be in a close-packed hexagonal space lattice. More specifically, at least substantially an entirety of the concentrated masses of the monolithic, unitary, porous material may be fused to one another in such a way as to be arranged in a close-packed hexagonal pattern, ensuring that the pores at the exterior as well as the interconnected network of interstitial spaces within the monolithic, unitary, porous material may be in a close-packed hexagonal space lattice.

Configurations for trims for valves in accordance with this disclosure, including distribution of output pores, the shapes for the tortuous path, and the shapes of external portions of trims for valves in accordance with this disclosure may reduce turbulent flow in subject fluids, at least immediately adjacent to and downstream of a given trim. In some embodiments, trims in accordance with this disclosure may reduce the intensity of, or eliminate, vibrations that would be produced if a stacked-plate-style trim were used.

Such a reduction in turbulent flow, and potential active inducement of laminar flow, may reduce the likelihood that the flow of the subject fluid through the valve, and particularly through the trim, would produce vibrations in the valve itself, as well as in the piping and other components upstream and downstream from the valve. For example, reductions in turbulent flow enabled by trims in accordance with this disclosure may reduce the likelihood that vibrations may cause unintended relative movement between components of the valve, such as between the stem and the bonnet, which may increase the reliability and accuracy of the operation of the valve, especially over long periods of time. In addition, reductions in turbulent flow enabled by trim in accordance with this disclosure may reduce the likelihood that vibrations may produce loud, disruptive audible noise in the vicinity of the valve.

Such valve trims may be utilized in a variety of useful applications. For example, such valve trims may beneficially be deployed in chemical processing, medical fluid handling, oil and gas exploration, and other environments where changes in pressure, accurate operation of valves, and low-noise operation may be desirable. Such valve trims may be of particular use when large pressure drops in subject fluids are desired.

Additional, nonlimiting embodiments within the scope of this disclosure include at least the following:

Embodiment 1: A valve trim, comprising: an annulus comprising a monolithic, unitary, porous material defining a tortuous, interconnected space extending radially through the annulus, pores at an exterior of the monolithic, unitary, porous material being arranged in a close-packed hexagonal space lattice.

Embodiment 2: The valve trim of Embodiment 1, wherein concentrated masses of the monolithic, unitary, porous material are arranged in a close-packed hexagonal pattern.

Embodiment 3: The valve trim of Embodiment 1 or Embodiment 2, wherein a density of the monolithic, unitary, porous material is about 7 g/cm³ or less.

Embodiment 4: The valve trim of Embodiment 3, wherein the density of the monolithic, unitary, porous material is between about 2.5 g/cm³ and about 6 g/cm³.

Embodiment 5: The valve trim of any one of Embodiments 1 through 4, wherein the monolithic, unitary, porous material is configured to induce a pressure drop of about 99.9% or less in a subject fluid as the subject fluid flows through the tortuous, interconnected space.

Embodiment 6: The valve trim of Embodiment 5, wherein the monolithic, unitary, porous material is configured to induce a pressure drop of between about 90% and about 99.6% in a subject fluid as the subject fluid flows through the tortuous, interconnected space.

Embodiment 7: The valve trim of any one of Embodiments 1 through 6, wherein portions of the monolithic, unitary, porous material adjacent to the pores at the exterior have at least substantially pyramid shapes, with peaks of the shapes facing away from a central geometric axis of the annulus.

Embodiment 8: The valve trim of Embodiment 7, wherein the portions of the monolithic, unitary, porous material adjacent to the pores at the exterior have at least substantially conic shapes.

Embodiment 9: The valve trim of any one of Embodiments 1 through 8, wherein the monolithic, unitary, porous material is configured to induce laminar flow in a subject fluid downstream of the annulus.

Embodiment 10: A valve configured to induce a pressure drop in a subject fluid, comprising: an inlet, a seat, an outlet, and a valve trim located around the seat and interposed between the inlet and the outlet, the valve trim comprising an annulus comprising a monolithic, unitary, porous material defining a tortuous, interconnected space extending radially through the annulus, pores at an exterior of the monolithic, unitary, porous material being arranged in a close-packed hexagonal space lattice.

Embodiment 11: The valve of Embodiment 10, wherein concentrated masses of the monolithic, unitary, porous material are arranged in a close-packed hexagonal pattern.

Embodiment 12: The valve of Embodiment 10 or Embodiment 11, wherein a density of the monolithic, unitary, porous material is about 7 g/cm³ or less.

Embodiment 13: The valve of any one of Embodiments 10 through 12, wherein the monolithic, unitary, porous material is configured to induce a pressure drop of about 99.9% or less in a subject fluid as the subject fluid flows through the tortuous, interconnected space.

Embodiment 14: The valve of any one of Embodiments 10 through 13, wherein portions of the monolithic, unitary, porous material adjacent to the pores at the exterior have at least substantially pyramid shapes, with peaks of the shapes facing away from a central geometric axis of the annulus.

Embodiment 15: A method of making a valve trim, comprising: sequentially placing discrete quantities of material in a shape of an annulus; exposing the discrete quantities of the material to heat to fuse the discrete quantities of material to one another, forming a monolithic, unitary, porous material defining a tortuous, interconnected space extending radially through the annulus; and defining pores at an exterior of the monolithic, unitary, porous material to be in a close-packed hexagonal space lattice.

Embodiment 16: The method of Embodiment 15, wherein sequentially placing the discrete quantities of the material in the shape of the annulus comprises depositing the discrete quantities in the shape of the annulus in layers or affixing the discrete quantities to one another in the shape of the annulus from within a powder bed of the material.

Embodiment 17: The method of Embodiment 15 or Embodiment 16, wherein exposing the discrete quantities of the material to the heat comprises sintering a green part comprising the discrete quantities of the material in a furnace or directing radiation emitted by a laser toward the discrete quantities of the material.

Embodiment 18: The method of any one of Embodiments 15 through 17, further comprising fusing concentrated masses of the monolithic, unitary, porous material to be arranged in a close-packed hexagonal pattern.

Embodiment 19: The method of any one of Embodiments 15 through 18, further comprising rendering a density of the monolithic, unitary, porous material to be about 7 g/cm³ or less.

Embodiment 20: The method of any one of Embodiments 15 through 19, further comprising shaping portions of the monolithic, unitary, porous material adjacent to the pores at the exterior to have at least substantially pyramid shapes, with peaks of the shapes facing away from a central geometric axis of the annulus.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure.

What is claimed is:

1. A valve trim, comprising:
an annulus comprising interconnected, concentrated masses of a material forming a monolithic, unitary, porous material defining a tortuous, interconnected space extending radially through the annulus, the tortuous interconnected space comprising a network of interconnected pores among the interconnected, concentrated masses of the monolithic, unitary, porous material, the network of interconnected pores configured to enable fluid flow radially through the annulus, some of the interconnected pores located at an exterior of the monolithic, unitary, porous material and arranged in a close-packed hexagonal space lattice.

2. The valve trim of claim 1, wherein the interconnected, concentrated masses of the material are arranged in a close-packed hexagonal pattern.

3. The valve trim of claim 1, wherein a density of the monolithic, unitary, porous material is about 7 g/cm³ or less.

4. The valve trim of claim 3, wherein the density of the monolithic, unitary, porous material is between about 2.5 g/cm³ and about 6 g/cm³.

5. The valve trim of claim 1, wherein the monolithic, unitary, porous material is configured to induce a pressure drop of about 99.9% or less in a subject fluid as the subject fluid flows through the tortuous, interconnected space.

6. The valve trim of claim 5, wherein the monolithic, unitary, porous material is configured to induce a pressure drop of between about 90% and about 99.6% in the subject fluid as the subject fluid flows through the tortuous, interconnected space.

7. The valve trim of claim 1, wherein portions of the monolithic, unitary, porous material adjacent to the some of the pores at the exterior have at least substantially pyramid shapes, with peaks of the shapes facing away from a central geometric axis of the annulus.

8. The valve trim of claim 7, wherein the portions of the monolithic, unitary, porous material adjacent to the some of the pores at the exterior have at least substantially conic shapes.

9. The valve trim of claim 1, wherein the monolithic, unitary, porous material is configured to induce laminar flow in a subject fluid downstream of the annulus.

10. The valve trim of claim 1, further comprising at least one region of nonporous material interposed between two regions of the monolithic, unitary, porous material.

11. A valve configured to induce a pressure drop in a subject fluid, comprising: an inlet, a seat, an outlet, and
a valve trim located around the seat and interposed between the inlet and the outlet, the valve trim comprising an annulus comprising interconnected, concentrated masses of a material forming a monolithic, unitary, porous material defining a tortuous, interconnected space extending radially through the annulus, the tortuous interconnected space comprising a network of interconnected pores among the interconnected, concentrated masses of the monolithic, unitary, porous material, the network of interconnected pores configured to enable fluid flow radially through the annulus, some of the interconnected pores located at an exterior of the monolithic, unitary, porous material and arranged in a close-packed hexagonal space lattice.

12. The valve of claim 11, wherein the interconnected, concentrated masses of the material are arranged in a close-packed hexagonal pattern.

13. The valve of claim 11, wherein a density of the monolithic, unitary, porous material is about 7 g/cm³ or less.

14. The valve of claim 11, wherein portions of the monolithic, unitary, porous material adjacent to the some of the pores at the exterior have at least substantially pyramid shapes, with peaks of the shapes facing away from a central geometric axis of the annulus.

15. A method of making a valve trim, comprising:
sequentially placing discrete quantities of material in a shape of an annulus;
exposing the discrete quantities of the material to heat to fuse the discrete quantities of material to one another, forming interconnected, concentrated masses of the material forming a monolithic, unitary, porous material defining a tortuous, interconnected space extending radially through the annulus, the tortuous interconnected space comprising a network of interconnected pores among the interconnected, concentrated masses of the monolithic, unitary, porous material, the network of interconnected pores configured to enable fluid flow radially through the annulus; and
defining the pores at an exterior of the monolithic, unitary, porous material to be in a close-packed hexagonal space lattice.

16. The method of claim 15, wherein sequentially placing the discrete quantities of the material in the shape of the annulus comprises depositing the discrete quantities in the shape of the annulus in layers or affixing the discrete quantities to one another in the shape of the annulus from within a powder bed of the material.

17. The method of claim 15, wherein exposing the discrete quantities of the material to the heat comprises sintering a green part comprising the discrete quantities of the material in a furnace or directing radiation emitted by a laser toward the discrete quantities of the material.

18. The method of claim 15, further comprising fusing the interconnected, concentrated masses of the material to be arranged in a close-packed hexagonal pattern.

19. The method of claim 15, further comprising rendering a density of the monolithic, unitary, porous material to be about 7 g/cm³ or less.

20. The method of claim 15, further comprising shaping portions of the monolithic, unitary, porous material adjacent to the pores at the exterior to have at least substantially pyramid shapes, with peaks of the shapes facing away from a central geometric axis of the annulus.

\* \* \* \* \*